United States Patent [19]
Watson

[11] Patent Number: 4,460,334
[45] Date of Patent: Jul. 17, 1984

[54] RECUPERATOR

[75] Inventor: James E. Watson, Southgate, Mich.

[73] Assignee: North American Mfg. Company, Cleveland, Ohio

[21] Appl. No.: 439,397

[22] Filed: Nov. 5, 1982

[51] Int. Cl.³ .......................... F24H 1/00; F28F 19/00
[52] U.S. Cl. ................................ 432/223; 165/134 R; 432/4
[58] Field of Search .................. 165/134 R; 432/4, 32, 432/223

[56] References Cited

U.S. PATENT DOCUMENTS

| | | | |
|---|---|---|---|
| 1,918,966 | 7/1933 | Harkness | 165/134 X |
| 2,945,522 | 8/1960 | Keller | 165/134 X |

OTHER PUBLICATIONS

North American Bulletins 84.83 and 84.85 Entitled: North American Recuperators.

North American Bulletin entitled: North American Recuperators.

Primary Examiner—John J. Camby
Attorney, Agent, or Firm—Body, Vickers & Daniels

[57] ABSTRACT

There is provided an improvement in a recuperator of the type having an elongated flow passage defined by an inner heat exchanger wall wherein the flow passage has a selected cross-sectional shape, a lower hot gas entrant end adjacent the gas outlet of a heating furnace and an upper gas exit end above and axially aligned with the lower end of the passage. The improvement involves the use of a radiator member in the form of a plug reciprocably mounted within said passage and movable axially within the passage between a normal plug position adjacent the upper end of the flow passage and a furnace capping position adjacent the lower end of the flow passage.

17 Claims, 4 Drawing Figures

RECUPERATOR

The present invention relates to the art of recuperators of the type used for preheating air to be used in a gas furnace with the hot gaseous products of combustion issuing from the furnace at an exit flue, and, more particularly, to an improvement in this type of recuperator.

BACKGROUND OF THE INVENTION

In processing workpieces, such as steel ingots, it is standard practice to heat the steel preparatory to subsequent processing, such as rolling, forging and/or heat treating. This heating process is performed in a processing furnace which, in many instances, includes an inner chamber into which gas fired burners propel hot gases for use in the actual heating operation. These furnaces generally include some type of circulatory system whereby the hot gases can be used to transfer heat to the material being heated so that the hot gases, or products of combustion, are cooled and exit the furnace chamber through a flue. Even though the gaseous products of combustion are cooled, they still have a substantial elevation of temperature and contain a high level of heat energy. In an attempt to conserve energy, it is common practice to provide a recuperator at the flue of the furnace, especially a furnace operating at high temperatures, so that the heat energy in the products of combustion can be transferred to another media for subsequent use. In practice, this media is generally air preheated by the recuperator preparatory to use in a gas fired burner of the furnace. In this manner, the fuel used to raise the temperature of the air to the burning temperature at the outlet of the burner is reduced. This type of recuperator is employed especially in high temperature furnaces, such as furnaces having a flue gas temperature in the neighborhood of 1,800° F. to 2,400° F. Such recuperators can preheat the burner air to over 1,000° F., thus, saving substantial overall energy consumption of the furnace installation. A central, cylindrical passage extends through the recuperator to form the passage for the flue gases. Cold air is forced through an annular chamber surrounding the central flow chamber so that the burner air is heated by the flue gases. Commonly, the flow of air is in the same direction as the flow of flue gases so that the incoming cold air can dissipate energy at the furnace flue where the temperature of the flue gases is at a maximum. As the air flows along the central flue gas chamber, it continues to be heated as the flue gases are cooled. In some instances, the top of the recuperator includes a refractory plug that moves toward and away from the exit end of the chamber through which the products of combustion is flowing. In this manner, the plug can be reciprocated vertically to control the gas pressure within the furnace and also provide a radiator cap on the top of the recuperator to retain heat in the recuperator itself and in the furnace. This refractory plug faces the interior of the furnace from the opposite or gas exit end of the recuperator. By using a refractory wall, radiation lost through the recuperator is reduced.

In some instances, the exit end of the recuperator is provided with a cylindrical structure that can be telescoped into the exit end of the recuperator. This structure combines with the inner surface of the recuperator to define an annular passageway having a substantial length at the outlet end of the recuperator. Consequently, the velocity of the flue gases passing through this smaller annular opening, is increased to increase the convection heat transfer from the flue gases to the burner air being preheated. This type of structure is called a "core buster" and also serves the function of a radiator to prevent radiant heat loss through the recuperator.

Other arrangements are employed for controlling the pressure of the gas within the furnace and for preventing radiation through the recuperator. One of the common arrangements is the provision of a duct having an elbow above the recuperator and extending to the atmosphere. Within this duct, a valve can be provided for changing the back pressure at the outlet end of the recuperator to control the gas pressure within the furnace itself. Other arrangements can be employed for this same purpose.

One problem area for recuperators of the type described above is that when the air flowing through the recuperator is discontinued because of a system malfunction or for other reasons, the radiant heat from the furnace itself can cause over heating of the lower end of the recuperator. Various arrangements have been suggested for correcting this problem, such as an auxiliary supply of cooling air during emergency conditions.

THE INVENTION

The present invention relates to an improvement in a recuperator of the type discussed above, which improvement allows for the normal operation of the recuperator and prevents damage to the recuperator when air flow through the recuperator is too low to maintain desirable temperatures in the recuperator, or when other conditions exist which allow radiant heat from the furnace to over heat the recuperator.

In accordance with the present invention, there is provided a radiator member at the top of the recuperator which is in the form of a refractory plug having an outer periphery generally matching the cross-sectional shape of the recuperator, but somewhat smaller than the inner wall of the recuperator. In this manner, the refractory plug can be moved axially in the inner chamber of the recuperator between a normal plug position adjacent the upper end of the recuperator and a furnace capping position adjacent the lower end of the recuperator. When in the lower position, the refractory cap closes the furnace flue to prevent radiation from the furnace to the walls of the recuperator. The same radiator member may be used at the top of the recuperator for the purpose of controlling the gas pressure in the furnace. In this instance, the plug is movable through a short distance to control the effective outlet area of the recuperator to change the pressure in the recuperator and in the furnace.

The primary object of the invention is the provision of an improved recuperator of the type mounted upon a high temperature gas processing furnace, which recuperator has an arrangement to prevent over heating of the recuperator by radiation heat from the furnace during emergency conditions, such as reduced or discontinued air flow, power shut-down, or over heated air in the air portion of the recuperator.

Still a further object of the present invention is the provision of a recuperator that is easy to produce and uses an existing overall recuperator design while allowing the dual use of a refractory plug or core buster.

Still a further object of the present invention is the provision of a recuperator, as defined above, which recuperator can control the pressure within the furnace itself and still prevent over heating of the recuperator when emergency conditions exist.

These and other objects and advantages will become apparent from the following description taken together with the drawings described in the following section.

DISCLOSURE

Figure 1:
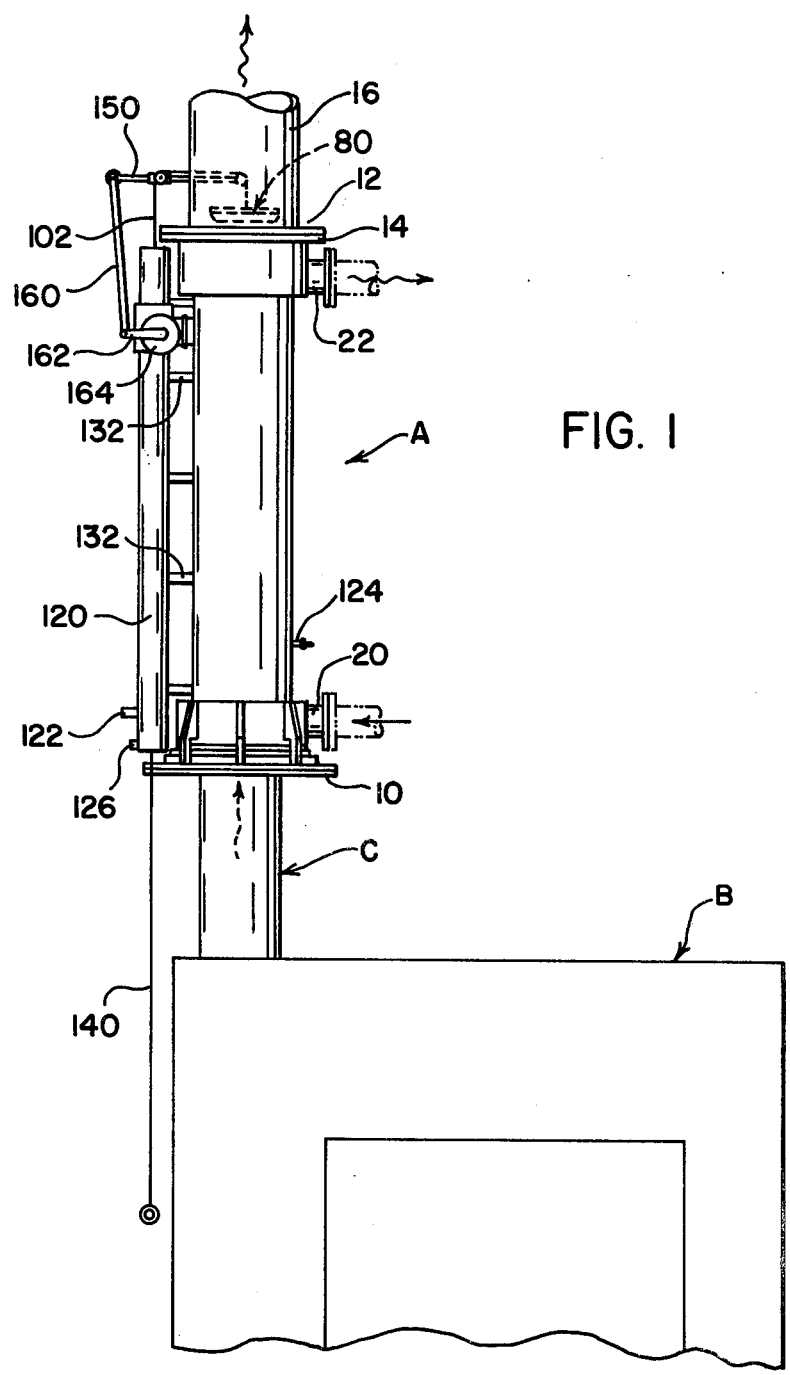
FIG. 1 is a side elevational view showing the preferred embodiment of the present invention.

Referring now to the drawings wherein the showings are for the purpose of illustrating a preferred embodiment of the invention only and not for the purpose of limiting the same, FIG. 1 shows a recuperator A adapted to be mounted onto a flange 10 to accept hot gases from furnace B traveling upwardly through flue C. Outlet 12 of recuperator A is connected by a flange 14 to an upwardly and outwardly extending duct 16. In this manner, hot flue gases in the form of products of combustion pass from flue C to duct 16 by passing through recuperator A. The flue gases can be as high as approximately 2,400° F. Air introduced at inlet 20 flows upwardly through recuperator A to a preheat air outlet 22. This air is then directed to burners used in furnace B to reduce the energy required in the furnace. When 2,400° F. flue gases are accepted by recuperator A, preheat air from outlet 22 can be over 1,000° F. resulting in a comparable reduction of energy required to heat and hold furnace B. Radiation from duct C is directed in a straight line through recuperator A in line with duct 16. As so far described, recuperator A is connected in accordance with standard parallel flow recuperation of products of combustion from a high temperature furnace, such as a furnace for heat treating metal, heating metal to be forged, melting aluminum, and refining glass.

Figure 2:
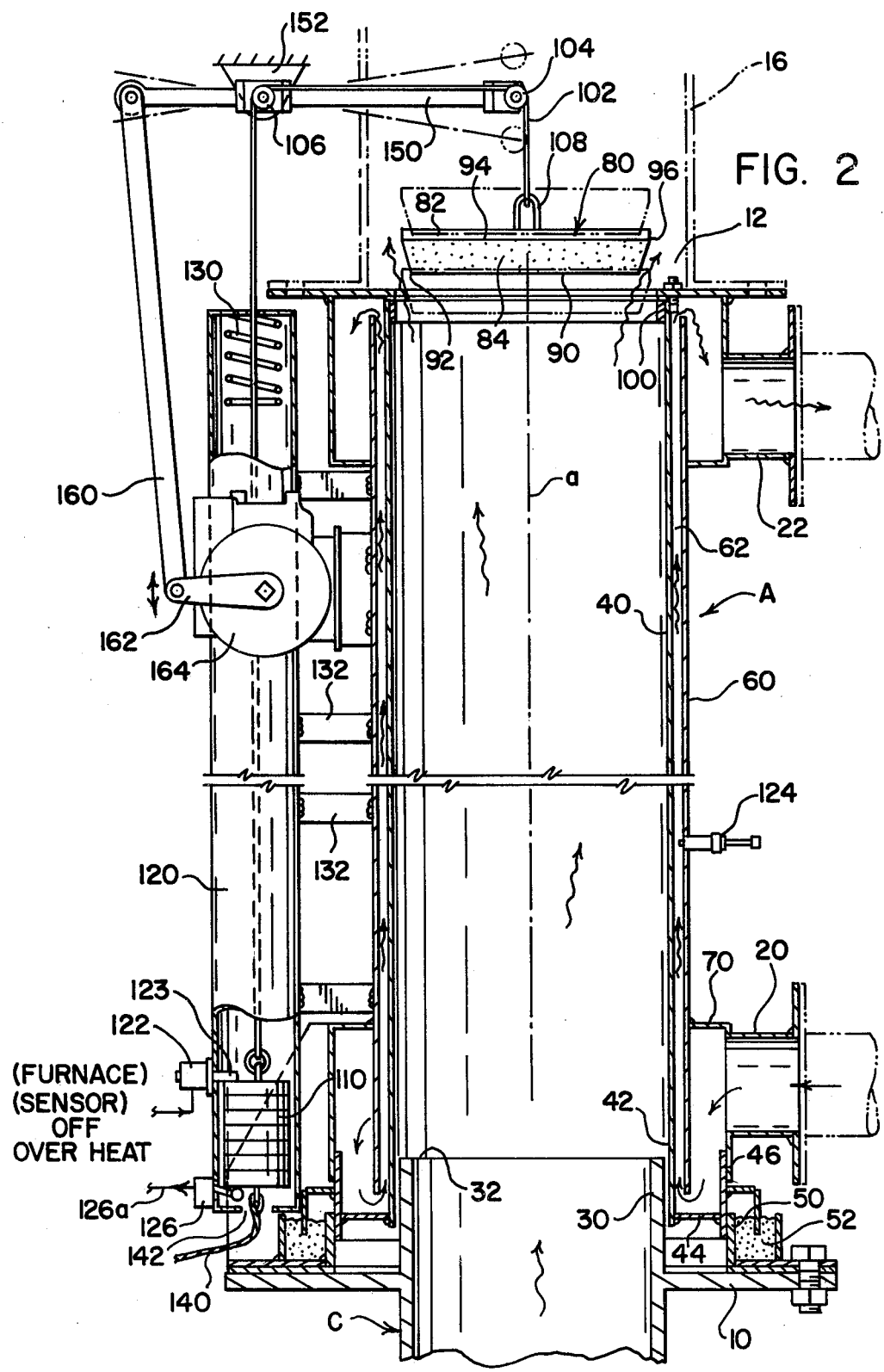
FIG. 2 is a partially cross-section view showing, in more detail, the preferred embodiment of the present invention during normal operating conditions.
Figure 3:
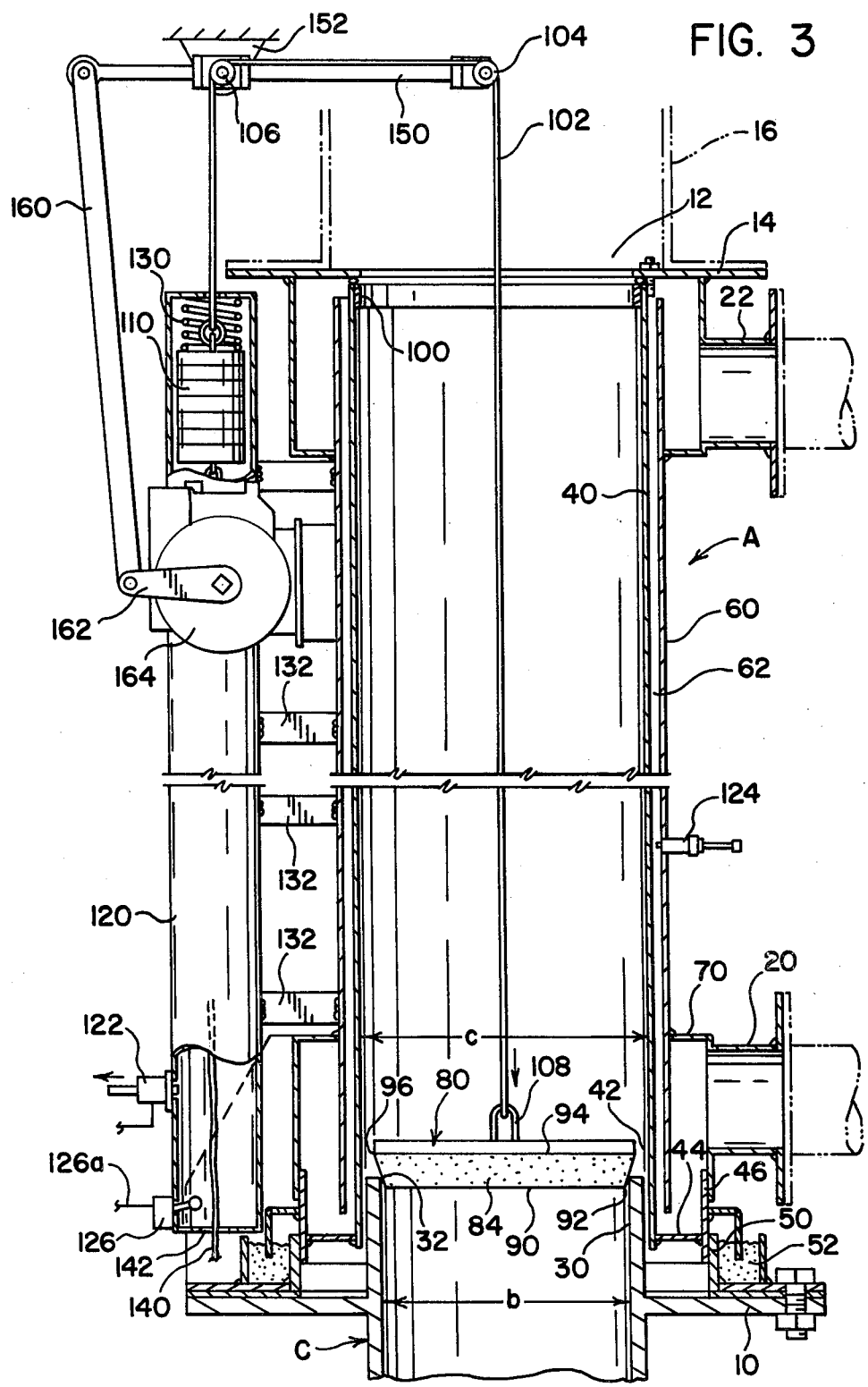
FIG. 3 is a view similar to FIG. 2 showing the preferred embodiment of the present invention in an emergency condition; and, FIG. 4 is a partial view similar to FIGS. 2 and 3 showing a modification of the preferred embodiment of the invention.

Referring now to FIGS. 2 and 3, the preferred embodiment of the invention is illustrated. Before discussing the invention, it should be noted that the recuperator A has somewhat standard construction. For instance, the recuperator is mounted on a flue extension 30 having an outlet opening 32 with a diameter indicated as diameter b. Cylindrical wall 40 is concentric with a central axis a and is coaxial with extension 30 so that radiant heat from flue C is directed upwardly through inner wall 40 toward duct 16. Lower end 42 of cylindrical wall 40 is at the lower portion of recuperator A and is at the area where wall 40 is telescoped over extension 30. Support ring 44 is welded to the outer surface of wall 40 and cooperates with sleeve 46 and nipple 50 to support the lower end of recuperator A. A standard sand seal 52 is used at the lower end of recuperator A.

Coaxially mounted with respect to inner wall 40, which is contacted by the products of combustion, there is provided an outer wall 60 to define an annular passageway 62 through which air passes during operation of recuperator A. A support frame 70 secures the outer frame with respect to flange 10. The lower portion of recuperator A is, thus, fixedly secured over extension 30 of flue C. As so far described, the recuperator has structure in accordance with standard recuperator design.

Referring now to the preferred embodiment of the invention, a circular refractory plug 80 having a circular outer periphery or cross-section has a back metal plate 82 and a front conical refractory nose 84. This nose includes an outer face 90 having an outer circular periphery 92 which is less than b in diameter. Rearward surface or back 94 of refractory nose 84 includes an outer circular periphery 96 which is greater in diameter than diameter b of flue extension 30. In addition, outer periphery 96 has a diameter less than diameter c which is the internal diameter of metal wall 40. A metering ring 100 has a diameter less than diameter c but still greater than the outer peripheral diameter of plug 80 and, more particularly, plate 82 of this plug. In some instances, plug 80 has been employed at the exit end 12 of a recuperator such as recuperator A. In this manner, plug 80 intercepts radiant energy from flue C and prevents it from over heating duct 16. To modulate the pressure within furnace B, the plug 80 can be moved with respect to end 12 to increase or decrease back pressure through the inner passageway defined by wall 40.

In accordance with the preferred embodiment of the present invention, plug 80 can be moved between the upper normal position shown in FIG. 2 to a lower emergency position shown in FIG. 3 wherein plug 80 caps flue extension 30 to prevent radiation from the flue and furnace toward the lower end 42 of wall 40. To accomplish this moving action for the plug, a variety of structural features could be used; however, in the preferred embodiment, a cable or other elongated suspension device is entrained over pulleys 104, 106 and connected to plate 82 by clevis or hook 108. A series of cylindrical weights 110 are used to counterbalance the weight of plug 80 so it can be moved gradually by gravity between the normal position shown in FIG. 2 and the emergency position shown in FIG. 3. Weights 110 reciprocate within a cylindrical guide tube 120. Within this tube there is provided a release mechanism 122 having an inwardly extending keeper 123. A sensor 124 can sense an over heating of wall 40, an undesired elevated temperature of air flowing through annular passage 62 or other over heating conditions. Whenever a signal has been created by an appropriate sensor, indicating an undesired condition of the furnace or recuperator, a signal is directed to release mechanism 122 for retracting keeper 123, as shown in FIG. 3. In this manner, plug 80 moves by gravity on cable 102 to a lower position capping flue C. Thus, whenever an emergency or other undesired condition is detected, plug 80 caps flue C. In this manner, radiant heat from within the furnace and within the flue cannot destroy or otherwise deteriorate the lower portion 42 of recuperator A. A signal to mechanism 122 could be generated to indicate that blowers forcing air through recuperator A are not energized. Of course, various other parameters could be employed for releasing plug 80 by a mechanism schematically illustrated as release mechanism 122.

Below weights 110 when plug 80 is in the normal position, shown in FIG. 2, an indicator switch 126 will be actuated. This switch creates a signal in line 126a to indicate that the weights are in the cocked, lower position shown in FIG. 2. When weights 110 have been released, as shown in FIG. 3, switch 126 is toggled to change the logic in output line 126a. The upper end of tube 120 includes a downwardly facing compression spring 130 which acts as a decelerator or snubber to decrease the speed of nose 84 as it approaches opening 42 on extension 30. To move nose 84 from the emergency condition to the cocked upper position, a cord or line 140 is secured to the end of weights 110 and outwardly through opening 142. By pulling this cord or line, plug 80 is shifted into the upper position and keeper 123 is extended. In this position, a signal in line 126a indicates that the plug is in its normal operating condition.

Plug 80 can also be used to modulate or control back pressure through recuperator A by changing the size of the annular orifice defined by ring 100 and plug 80. To accomplish this pressure modulation, the preferred embodiment employs a link 150 mounted to pivot about trunion 152 at the axis of pulley 106. One end of link 150 carries pulley 104. The other end of link 150 supports a downwardly extending lever 160 connected to a bellcrank or arm 162 oscillated by controller 164. The position of operator arm 162 determines the position of pulley 104 and thus the position of plug 80 with respect to ring 100. In this manner, a standard pressure sensing device can control the position of arm 162 to control the back pressure through recuperator A and thus the operating gas pressure in furnace B.

Figure 4:
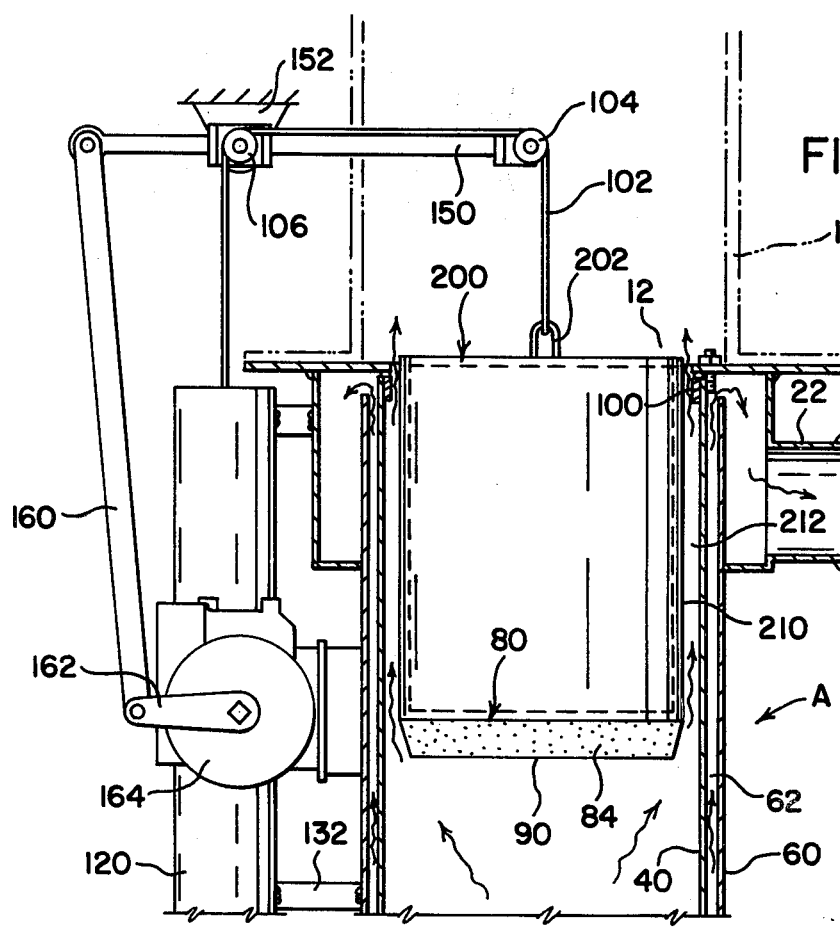

Referring now to FIG. 4, an alternative embodiment of the invention is illustrated. Like parts have the same numbers as used in disclosing the preferred embodiment of the invention. In this modification, a somewhat standard core buster 200 is suspended on cable 102 by a clevis or hook 202. Outer cylindrical surface 210 is coaxial with wall 40 to define an elongated, annular orifice 212. Since the annular orifice has a substantially reduced cross-section at the upper portion of wall 40, flue gases passing into duct 16 have an increased velocity at the upper portion of wall 40. At this position, the preheat air is at its highest temperature and the flue gases are at a lower temperature. This reduced area causes an increased rate of flow between the flue gases and surface 40 to provide a higher convection transfer of heat energy from the flue gases to wall 40. The operating characteristics of plug 80 in FIG. 4 is somewhat different from the plug 80 in the preferred embodiment. It still provides the emergency operation; however, pressure regulation is not provided by reciprocation of the nose adjacent the upper end of wall 40.

Having thus defined the invention, the following is claimed:

1. In a recuperator of the type having an inner chamber defining an elongated flow passage of a selected cross-sectional shape, said passage having a lower hot gas entrant end adjacent the gas outlet of a heating furnace, and an upper gas exit end above and axially aligned with said lower end, an outer chamber surrounding said inner chamber, a wall member between said inner chamber and said outer chamber, means for passing air to be heated through said outer chamber along said wall member, and a radiator member adjacent said upper end, the improvement comprising: said radiator member being a plug having an outer periphery generally matching, but smaller than, said cross-sectional shape of said passage whereby said plug can move axially in said passage, and means for moving said plug axially through said flow passage between a normal operating position adjacent said upper end of said flow passage and a furnace capping position adjacent said lower end of said flow passage.

2. The improvement as defined in claim 1, wherein said cross-sectional shape is circular.

3. The improvement as defined in claim 1, wherein said moving means includes means for holding said plug in said normal position and means for releasing said plug for movement by gravity between said normal position to said capping position.

4. The improvement as defined in claim 3, wherein said holding means is a cable-like element for suspending said plug at said normal position and means for releasing said cable to release said plug.

5. The improvement as defined in claim 4, including means for detecting a selected furnace condition and means for releasing said plug upon detection of said furnace condition.

6. The improvement as defined in claim 3, including means for detecting a selected furnace condition and means for releasing said plug upon detecting of said furance condition.

7. The improvement as defined in claim 2, including a sensor for detecting a selected furnace condition and means for releasing said plug upon detecting of said furnace condition.

8. The improvement as defined in claim 5, including a pressure control mechanism comprising means for moving said plug adjacent said upper end an amount to provide a desired pressure in said passage and, thereby, in said furnace.

9. The improvement as defined in claim 5, including a pressure control mechanism comprising means for moving said plug adjacent said upper end an amount to provide a desired pressure in said passage and, thereby, in said furnace.

10. The improvement as defined in claim 3, including a pressure control mechanism comprising means for moving said plug adjacent said upper end an amount to provide a desired pressure in said passage and, thereby, in said furnace.

11. The improvement as defined in claim 1, including a pressure control mechanism comprising means for moving said plug adjacent said upper end an amount to provide a desired pressure in said passage and, thereby, in said furnace.

12. The improvement defined in claim 11, wherein said plug is suspended on an elongated element and said pressure control means includes means for moving said element and said plug axially in said flow passage adjacent said upper end.

13. The improvement defined in claim 10, wherein said plug is suspended on an elongated element and said pressure control means includes means for moving said element and said plug axially in said flow passage adjacent said upper end.

14. The improvement as defined in claim 1, wherein said plug includes an outer peripheral wall facing said inner wall and extending axially into said passage whereby said outer wall and inner wall define an elongated annular outlet for flue gases.

15. The improvement as defined in claim 1, including a device for reducing the velocity of said radiator member as it approaches said capping position.

16. The improvement as defined in claim 3, including means for reducing the velocity of said radiator member as it approaches said capping position.

17. The improvement as defined in claim 11, including means for reducing the velocity of said radiator member as it approaches said capping position.

* * * * *